(12) United States Patent
Lam et al.

(10) Patent No.: US 9,870,333 B1
(45) Date of Patent: Jan. 16, 2018

(54) INSTRUMENTATION CHASSIS INCLUDING INTEGRATED ACCELERATOR MODULE

(71) Applicant: KEYSIGHT TECHNOLOGIES, INC., Loveland, CO (US)

(72) Inventors: Kuen Yew Lam, Selangor (MY); Jared Richard, Fort Collins, CO (US); Chris R. Jacobsen, Fort Collins, CO (US); James Benson, Loveland, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 464 days.

(21) Appl. No.: 14/484,597

(22) Filed: Sep. 12, 2014

(51) Int. Cl.
*H05K 7/10* (2006.01)
*G06F 13/40* (2006.01)
*G06F 13/38* (2006.01)

(52) U.S. Cl.
CPC ........ *G06F 13/4068* (2013.01); *G06F 13/385* (2013.01); *G06F 13/409* (2013.01); *G06F 13/4022* (2013.01); *G06F 13/4027* (2013.01)

(58) Field of Classification Search
USPC .................. 710/300–315, 104–110
See application file for complete search history.

(56) References Cited

U.S. PATENT DOCUMENTS

| | | | | |
|---|---|---|---|---|
| 6,981,086 B2* | 12/2005 | Wetzel | ................... | G01D 21/00 710/300 |
| 7,149,093 B2* | 12/2006 | Conway | ............... | H05K 7/1461 361/679.4 |
| 7,257,154 B2* | 8/2007 | Ghiasi | .................. | H03L 7/0807 375/220 |
| 8,189,345 B2 | 5/2012 | Rapp et al. | | |
| 8,352,645 B2* | 1/2013 | Cummings | ............. | G06F 13/28 710/22 |
| 8,648,867 B2 | 2/2014 | Gorchetchnikov et al. | | |
| 8,661,178 B2 | 2/2014 | Richard | | |
| 8,756,360 B1* | 6/2014 | Richard | ............. | G06F 13/4022 710/316 |
| 9,480,184 B1* | 10/2016 | Engel | ............... | G01R 31/31907 |
| 2007/0040564 A1* | 2/2007 | Le | .................... | G01R 31/31726 714/731 |
| 2009/0251867 A1 | 10/2009 | Sharma et al. | | |
| 2014/0122915 A1* | 5/2014 | Frels | ......................... | G06F 1/12 713/400 |

* cited by examiner

*Primary Examiner* — Raymond Phan

(57) ABSTRACT

A peripheral component interconnect express (PCIe) eXtensions for instrumentation (PXIe) chassis includes a backplane, multiple peripheral slots, a mezzanine card and an integrated accelerator module. The peripheral slots are located on the backplane and configured to receive insertable PXIe peripheral modules, respectively. The mezzanine card is on the backplane and configured to accommodate at least one of connectors, integrated circuits (ICs) and signal lines incorporated in the PXIe chassis. The integrated accelerator module is on the mezzanine card within the PXIe chassis and configured to accelerate processing of signals received from the PXIe peripheral modules.

20 Claims, 5 Drawing Sheets

INSTRUMENTATION CHASSIS INCLUDING INTEGRATED ACCELERATOR MODULE

BACKGROUND

Peripheral component interconnect express (PCIe) is a standard for incorporating peripheral devices into computing systems. PCIe defines physical and logical interfaces and protocols for communication with PCIe compatible devices. PCIe may be used in consumer and industrial applications, for example, as a motherboard level interconnect, a passive backplane interconnect, and an expansion card interface. Various standards are based on PCIe, such as PCIe eXtensions for instrumentation (PXIe), which adapts PCIe for test and measurement applications.

PCIe compatible devices may be configured as peripheral modules and interconnected with one another and/or with a system controller through a network of PCIe switches (switch fabric) in a modular instrumentation framework (chassis). For example, the system controller may be connected to a root complex having PCIe ports, each of which is connected to a peripheral device or a PCIe switch. Each PCIe switch is connected to multiple PCIe slots in the chassis, which are configured to receive peripheral modules. The flexible nature of the switch fabric enables customization of an individual system.

Currently, high-speed digital and radio frequency (RF) signal test applications require higher processing capabilities to catch up with increasing bandwidth requirements of modern high bandwidth communications. In conventional modular instrumentation frameworks, such as PXIe compatible frameworks, more signal processing and data handling responsibilities in a measurement flow are being moved from traditional personal computer (PC)-based processing to hardware-based processing and acceleration, in which dedicated hardware is included in a measurement system for data processing. For example, high performance Graphics Processing Units (GPUs) may be used in PC graphics cards for measurement acceleration.

In addition, there is increasing interest in use of customizable accelerators, such as field programmable gate array (FPGA) accelerators, for measurement acceleration and other data processing. An advantage of FPGA-based acceleration is in the customizable nature of FPGAs, in which more efficient processing can be realized on dedicated logic and Digital Signal Processing (DSP) resources than can be achieved using general purpose central processing units (CPUs) and/or GPUs. FPGA accelerators are also able to provide more real-time and deterministic measurement/processing capabilities than can be achieved using normal PC-based processing. Further, the use of FPGAs for acceleration provides a higher power-per-watt advantage over CPU and GPUs, enabling lower power consumption and higher performance than traditional CPU-based and GPU-based acceleration.

With regard to conventional PXIe modular instrumentation, FPGA acceleration processing resources are incorporated in the form of a dedicated peripheral module that allows customized data processing algorithms and designs to be implemented. FIG. 1 is an illustrative plan view of conventional PXIe modular instrumentation, including a chassis 110 connected to a host PC 150. In particular, FIG. 1 shows the front panel of the chassis 110, which includes a vector signal analyzer 120, an accelerator module 130 and an interface module 140. Each of the various modules forming the vector signal analyzer 120, the accelerator module 130 and the interface module 140 plugs into a separate slot arranged on a backplane (not shown in FIG. 1) of the chassis 110. The vector signal analyzer 120 actually occupies eight adjacent peripheral slots, while the accelerator module 130 and the interface module 140 each occupies one peripheral slot. Slot panels, such as representative slot panel 115, are attached to the front panel of the chassis 110 for cover spaces corresponding to unused slots. Generally, the vector signal analyzer 120 may stream data at 2.5 gigabytes/second to the accelerator module 130, where real-time measurements, such as fast Fourier transform (FFT) and frequency mask triggering, may be performed prior to streaming the data to the host PC 150 at 4.0 gigabytes/second for display via the interface module 140. A downside of this conventional configuration, however, is that the accelerator module 130, which is commonly used in many applications, uses up one of the peripheral slots of the backplane that could otherwise be occupied by a less common peripheral module. Moreover, a typical two-channel RF measurement system requires up to two FPGA accelerator modules, thus occupying two peripheral slots that could otherwise be used for other modular measurement devices.

SUMMARY

In a representative embodiment, a peripheral component interconnect express (PCIe) eXtensions for instrumentation (PXIe) chassis includes a backplane, multiple peripheral slots, a mezzanine card and an integrated accelerator module. The peripheral slots are located on the backplane and configured to receive multiple insertable PXIe peripheral modules, respectively. The mezzanine card is on the backplane and configured to accommodate at least one of connectors, integrated circuits (ICs) and signal lines incorporated in the PXIe chassis. The integrated accelerator module is on the mezzanine card within the PXIe chassis and configured to accelerate processing of signals received from the plurality of PXIe peripheral modules.

In another representative embodiment, an instrumentation chassis includes a backplane, a peripheral slot located on the backplane and configured to receive an insertable peripheral module, and an integrated accelerator module configured to accelerate processing of signals received from the peripheral module. The integrated accelerator module includes a printed circuit board (PCB) located within the instrumentation chassis on an opposite side of the backplane than the peripheral slot.

In another representative embodiment, a PXIe system having a reconfigurable interface link architecture includes a system slot located on a backplane and configured to receive a PXIe compatible system controller, multiple peripheral slots located on the backplane and configured to receive multiple peripheral modules, and a switch fabric located on a mezzanine card mounted to the backplane. The PXIe system further includes a first integrated field programmable gate array (FPGA) accelerator module mounted to the mezzanine card and configured to accelerate processing of signals received from first peripheral modules of the multiple peripheral modules, a second integrated FPGA accelerator module mounted to the mezzanine card and configured to accelerate processing of signals received from second peripheral modules of the multiple peripheral modules, and a high-speed local bus connecting the first and second integrated FPGA accelerator modules.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings. Generally, it is understood that the drawings and the various elements depicted therein are not drawn to scale.

Generally, it is understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable.

As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Various representative embodiments generally provide one or more integrated accelerator modules with associated memory, such as integrated FPGA accelerator modules, mounted to a backplane and/or a mezzanine board within a chassis, such as a PXIe chassis. The one or more integrated accelerator modules replace accelerators that would otherwise be provided in one or more peripheral modules insertable through a front panel of the chassis into module slots on the chassis backplane, thereby freeing up one or more peripheral slots for alternative uses. In the case of more than one integrated accelerator module, a high-speed local bus may be included to for enabling high-speed data communications directly between the integrated accelerator modules.

Figure 2:
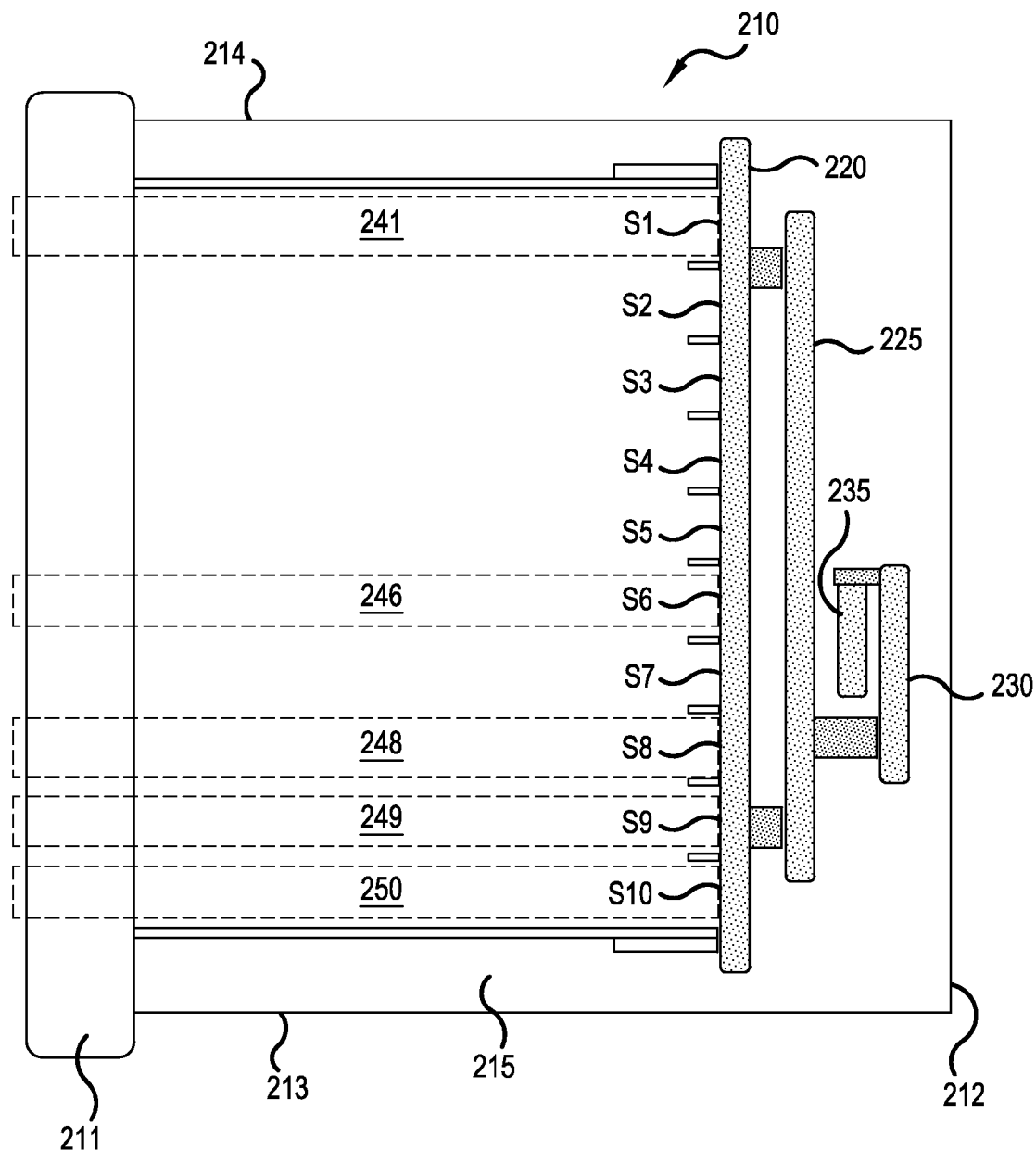
FIG. 2 is a simplified cross-sectional view of a chassis with an integrated accelerator module, according to a representative embodiment.

FIG. 2 is a simplified cross-sectional view of a chassis with an integrated accelerator module, according to a representative embodiment.

Referring to FIG. 2, chassis 210 may be a PXIe chassis or a hybrid PXI/PXIe chassis, for example. The chassis 210 includes a front panel 211, a rear panel 212, side panels 213 and 214, and a bottom panel 215. The chassis 210 also includes a cover (not shown in FIG. 2) that covers the front and rear panels 211 and 212, and the side panels 213 and 214, completely the enclosure. The front panel 211 provides a large front opening into which various types of modules (discussed below) may be removably inserted. Slot panels (not shown) may be attached to the front panel 211 to cover portions of the front opening corresponding to slots that are not occupied by removable modules. The cover may be integrally formed with the side panels 213 and 214 (and/or the rear panel 212), and may be removable as a single unit. In an embodiment, the rear panel 212 may be removable independent of the cover and side panels 213 and 214 to provide immediate access to the various components (discussed below) housed within the chassis 210. Of course the rear panel 212 and/or the side panels 213 and 214 may include openings or slots for ventilation, as would be apparent to one of ordinary skill in the art.

Figure 4:
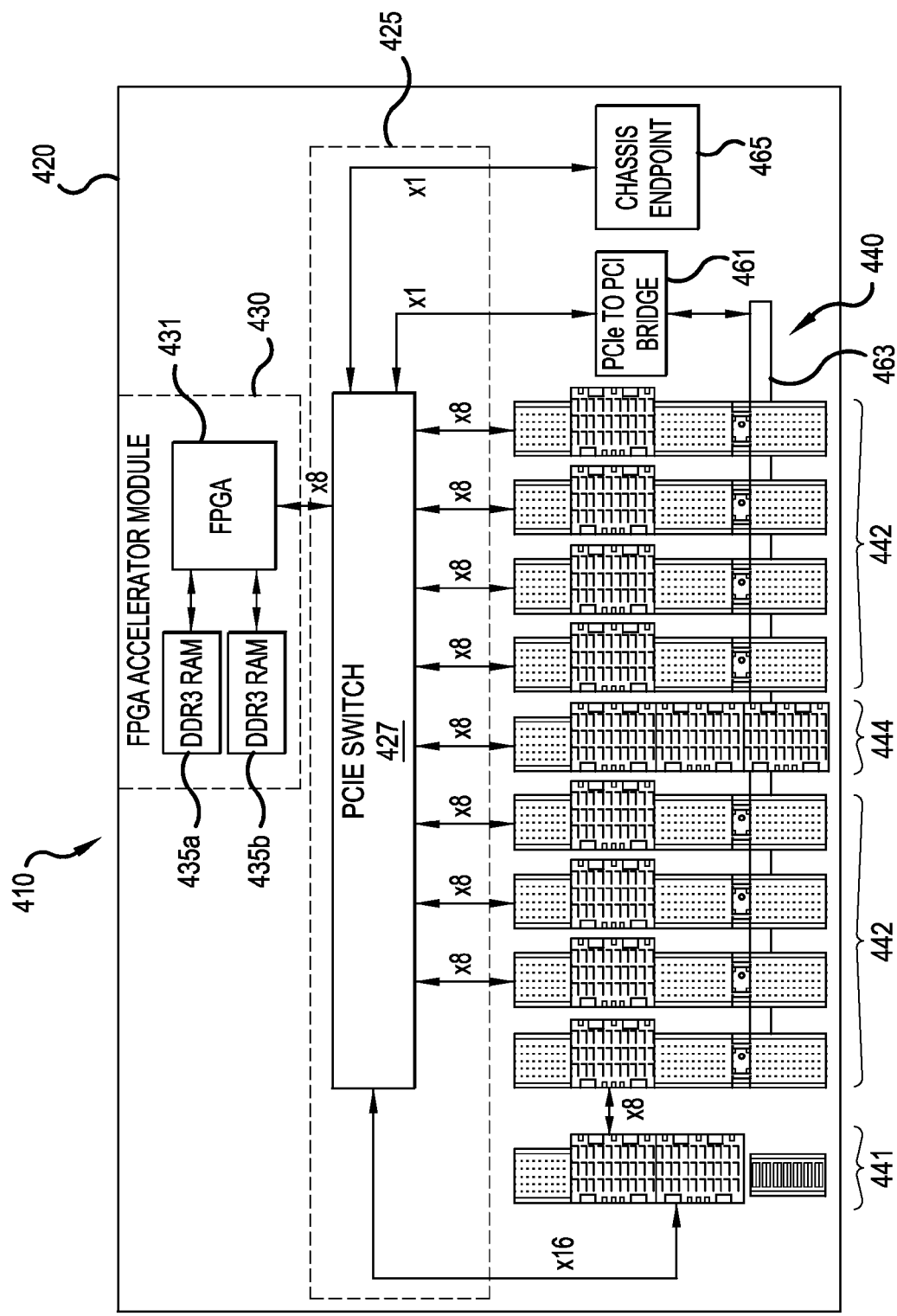
FIG. 4 is a block diagram of a chassis with an integrated accelerator module, according to a representative embodiment.
Figure 5:
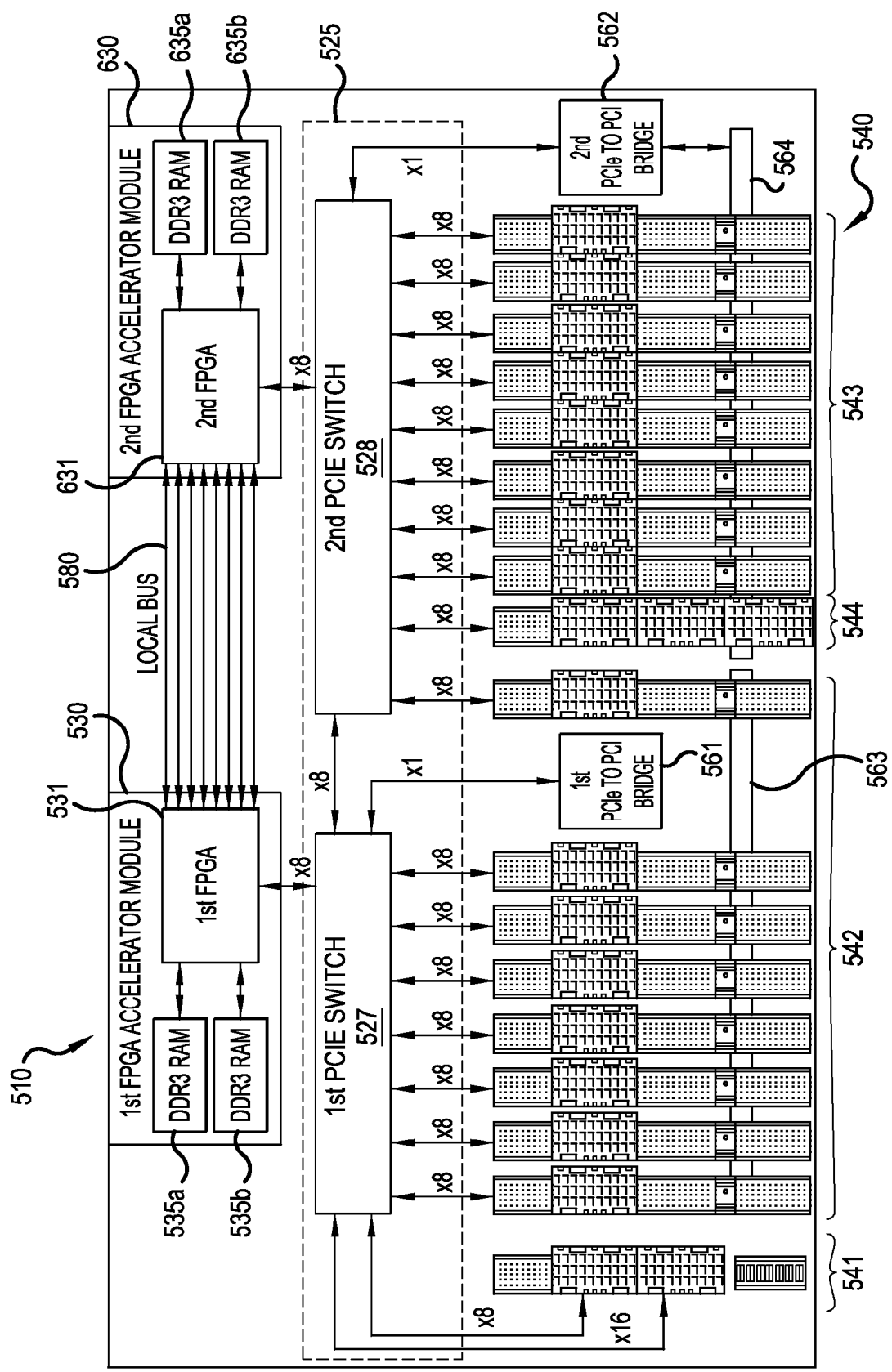
FIG. 5 is a block diagram of a chassis with multiple integrated accelerator modules, according to a representative embodiment.

Internally, the chassis 210 includes a backplane 220 and multiple module slots located on the backplane 220 (front side), generally indicated by representative module slots S1 through S10. Examples of how the module slots actually appear, facing the front side of the backplane 220, are depicted in FIGS. 4 and 5, discussed below. Each of the module slots is configured to receive an insertable module. For example, the chassis 210 may be a PXIe chassis, in which case the module slots include peripheral slots (S2-S5 and S7-S10), e.g., representative peripheral slots S8-S10 containing representative peripheral modules 248, 249 and 250, respectively, located on the backplane 220 for receiving any of a variety of PXIe or PXI compatible peripheral modules, a system timing slot (S6) for receiving a timing module e.g., timing module 246, to provide timing signals, and a system slot (S1) for receiving a system module, e.g., system module 241, which may include an internal PXIe system controller or a controller interface for interfacing with an external PXIe system controller to control operations of the peripheral modules, switches and an integrated accelerator module 230 (discussed below). Examples of the peripheral modules 248, 249 and 250 include arbitrary waveform generator modules, digital multi-meter (DMM) modules, oscilloscope modules, multiplexer modules, switch modules, and signal generator modules. The peripheral slots may include PXI slots, PXIe slots or hybrid slots for both PXI and PXIe modules, discussed below.

Of course, the chassis 210 and the various slots (and corresponding insertable modules) may comply with other standards, without departing from the scope of the present teachings. For example, the chassis 210 may be an Advanced Telecommunications Computing Architecture (ATCA) eXtensions for instrumentation (AXIe) chassis, in which case the module slots include peripheral slots for receiving any of a variety of AXIe compatible peripheral modules and a system slot for receiving a system module, which may include an internal AXIe system controller or an interface to an external AXIe system controller to control operations of the peripheral modules, switches and the integrated accelerator module 230 (discussed below).

A mezzanine card 225 is mounted on the backplane 220 (back side, i.e., the side of the backplane 220 opposite the module slots S1 to S10), and configured to provide circuitry for connectors, integrated circuits (ICs) and/or signal lines incorporated within the chassis 210. The mezzanine card 225 may be mounted to the backplane 220 using pillar and/or solder connections, for example. A switch fabric, including multiple switches mounted on the backplane 220 and/or the mezzanine card 225, enables selective connectivity among the peripheral modules 248, 249, 250, and between the peripheral modules 248, 249, 250 and the accelerator module 230, e.g., under control of the system module 241, to build a desired modular instrumentation system. In an embodiment, the switch fabric may be reconfigurable under control of the system module 241 to increase flexibility among the insertable modules, as described for example by U.S. Pat. No. 8,661,178 to Richard (issued Feb. 25, 2014), which is hereby incorporated by reference. For example, when the switch fabric is reconfigurable, it may be used for creating a variable number of PCIe interface links between the system slot and the peripheral slots S1 to S10, for example. A nonvolatile memory (not shown) may be included for storing switch images corresponding to configurations of the reconfigurable switch fabric.

The chassis 210 further includes the integrated accelerator module 230, which is a PCB mounted on the mezzanine card 225 (back side, i.e., the side of the mezzanine card 225 opposite the side connected to the backplane 220), and configured to accelerate processing of signals received from the peripheral modules via the mezzanine card 225. The integrated accelerator module 230 may be mounted to the mezzanine card 225 using pillar and/or solder connections, for example. The integrated accelerator module 230 has an associated memory circuit 235, which is a PCB mounted on the integrated accelerator module 230, although in alternative configurations, the memory circuit 235 may be located on the same PCB as the integrated accelerator module 230.

In an embodiment, the integrated accelerator module 230 may be an FPGA accelerator module, as mentioned above, that includes an FPGA computing card and associated memory, i.e., the memory circuit 235. The FPGA accelerator module may be connected to the mezzanine card 225 (and/or the backplane 220) via a high-speed serializer/deserializer (SERDES) connector. The memory circuit 235 may be a random-access memory (RAM), for example, such as a dynamic RAM (DRAM) or small outline-dual in-line memory module (SO-DIMM) double data rate type three (DDR3) RAM (SO-DIMM DDR3 RAM). Likewise, the memory circuit 235 may be connected to the FPGA accelerator module using a SO-SIMM connector. Of course, other types of RAM may be incorporated without departing from the scope of the present teachings. In alternative embodiments, an external associated memory is not needed. For example, next generation FPGA accelerator modules have up to one gigabit of static RAM on-die, eliminating the need for an external associated memory.

By mounting the integrated accelerator module 230 and associated memory circuit 235 on the mezzanine card 225, as opposed to including the accelerator in a peripheral module insertable within one of the peripheral slots, has a number of benefits. For example, a peripheral slot is freed up to accept other types of peripheral modules. Accordingly, a smaller chassis may be used (i.e., fewer peripheral slots) or another peripheral slot becomes available in the existing chassis 210 that can be used for other peripheral modules required for the desired functionality, increasing overall value to the customer. Also, the monetary cost is lower. That is, an interface between the chassis 210 and the accelerator module 230 (e.g., via the mezzanine card 225) may be implemented with "off-the-shelf" high-speed data connectors, such as SERDES and SO-DIMM DDR3 connectors and modules. Further, since the integrated accelerator module 230 does not need to conform to PXIe electrical and mechanical requirements of peripheral modules, additional cost savings are realized, increasing margin or reducing overall solution cost to the customer. In addition, integrated accelerator module 230 is available to all of the peripheral modules plugged into peripheral slots on the backplane 220 through the high-speed data connectors. This reduces communications among the peripheral modules through the backplane 220 and the mezzanine card 225, since the accelerator functionality is not provided by another peripheral module, thereby increasing data communication speed to and from the accelerator and thus overall processing speed. For example, a PXIe peripheral slot provides up to a PCIe Gen3 8× interface link to the inserted peripheral module. By having the integrated accelerator module 230 available in the chassis 210, an FPGA, for example, could theoretically use up to the maximum PCIe Gen3 16× interface link, effectively doubling the amount of bandwidth available to the FPGA accelerator.

In various embodiments, the integrated accelerator module 230 and/or the memory circuit 235 may be removable from the mezzanine card 225 (or from the integrated accelerator module 230 in the case of a separate PCB for the memory circuit 235), enabling different levels of performance. For example, the accelerator module 230 may have a separable connector, such as pins insertable into corresponding sockets, enabling easy attachment and detachment to and from the mezzanine card 225, including electrical connections to the circuitry on the mezzanine card 225. A similar arrangement may be incorporated with respect to attachment and detachment of the memory circuit 235 to/from the integrated accelerator module 230. The removal of the accelerator module 230 and/or the memory circuit 235 may be enabled by removing the cover or the rear panel 212 of the chassis 210. In this configuration, the integrated accelerator module 230 may be interchangeable with different types of integrated accelerator modules, such as an Application Specific Integrated Circuits (ASIC) accelerator. Also, new and unique FPGA technologies can be implemented with only a change of the accelerator module 230, so as IC technologies evolve, newer FPGAs can be incorporated into the chassis 210 quickly and easily. The chassis 210 can even be field-upgradeable as newer versions of the accelerator module 230 become available. Also, in various alternative embodiments, the integrated accelerator module 230 and/or the memory circuit 235 may be integrated directly on the mezzanine card 225, as opposed to a separate PCB(s), without departing from the scope of the present teachings.

Figure 3:
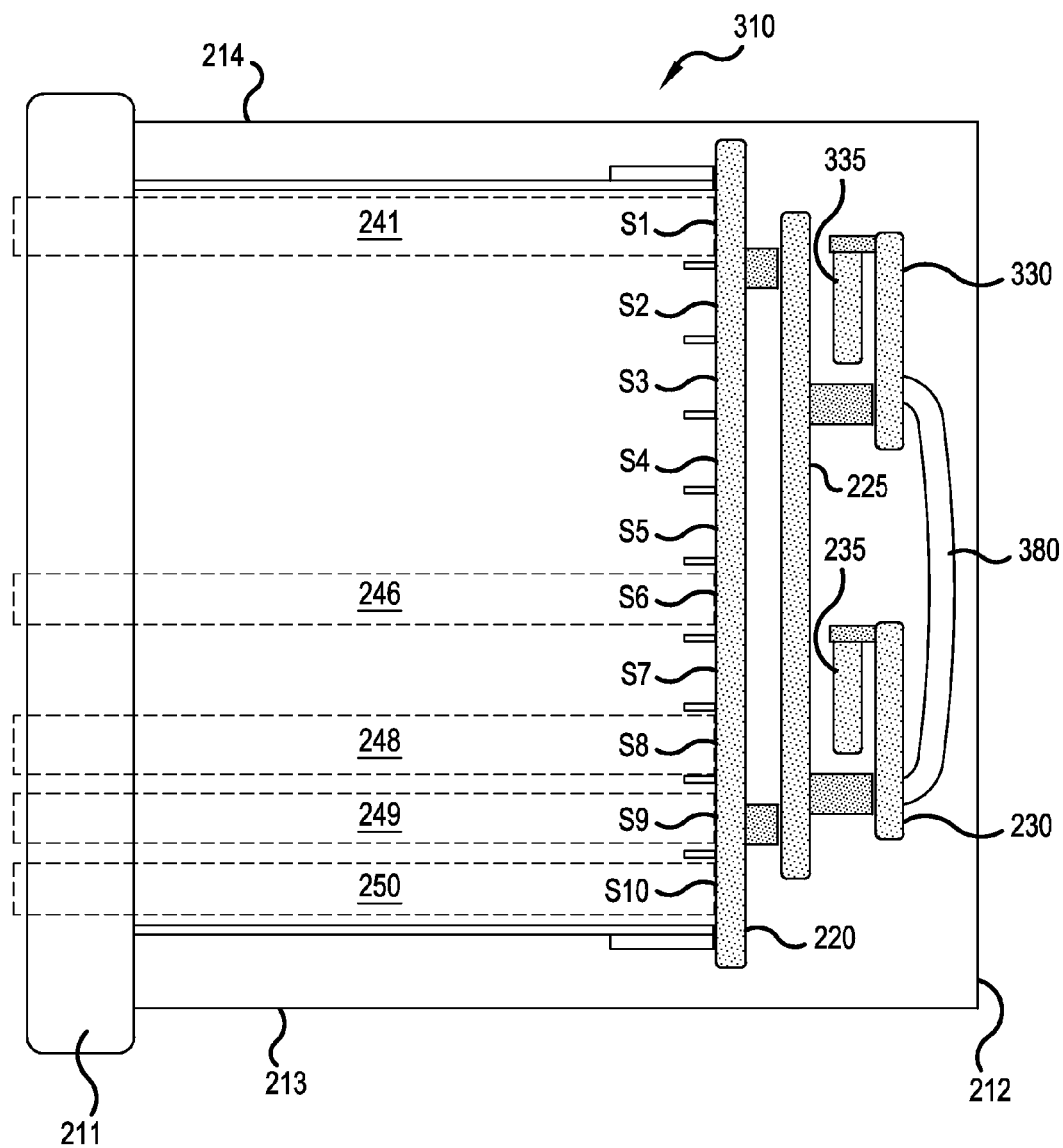
FIG. 3 is a simplified cross-sectional view of a chassis with multiple integrated accelerator modules connected by a high-speed local bus, according to a representative embodiment.

FIG. 3 is a simplified cross-sectional view of a chassis with multiple integrated accelerator modules connected by a high-speed local bus, according to a representative embodiment.

Referring to FIG. 3, chassis 210 includes two integrated accelerator modules and associated memory circuits, indicated by (first) accelerator module 230 with associated memory circuit 235, and (second) integrated accelerator module 330 with associated memory circuit 335. Although chassis 210 is shown as a 10-slot chassis, two integrated accelerator modules, such as integrated accelerator modules 230 and 330, are typically provided in an 18-slot chassis, such as chassis 510 shown in FIG. 5. Like the integrated accelerator module 230, discussed above, the integrated accelerator module 330 may comprise an FPGA accelerator, for example. In addition, the integrated accelerator module 330 is a PCB mounted on the back side of the mezzanine card 225, adjacent the integrated accelerator module 230, and configured to accelerate processing of signals received from the peripheral modules via the mezzanine card 225. The memory circuit 335 associated with the integrated accelerator module 330 is a PCB mounted on the integrated accelerator module 330, although in alternative configurations, the memory circuit 335 may be on the same PCB as the integrated accelerator module 330. The integrated accelerator modules 230 and 330 are configured to accelerate processing of signals received from the peripheral modules.

In the depicted embodiment, a high-speed local bus 380 is connected between the accelerator module 230 and the accelerator module 330, enabling direct communications between the integrated accelerator modules 230 and 330. The local bus 380 enables faster data transfer rates than circuits, such as the switch fabric, provided on the mezzanine card 225, for example. As discussed below, the accelerator module 230 may comprise a Stratix-V FPGA, for example, available from Altera Corporation, which includes 25 gigabytes/second transceivers, providing up to three times more bandwidth than a single PCIe Gen3 interface link, thereby providing much higher transfer rates than is available via the PCIe switch infrastructure. Further, inclusion of the second integrated accelerator module 330 on the mezzanine card 225 frees up yet another peripheral slot on the backplane 220 for other types of peripheral modules (with access now to two integrated accelerator modules 230 and 330). The high-speed local bus 380 between the integrated accelerator modules 230 and 330 allows further data and computational sharing for greater performance. This is not possible when multiple accelerator modules are inserted as peripheral modules.

FIG. 4 is a block diagram of a 10-slot chassis with an integrated accelerator module, according to a representative embodiment.

Referring to FIG. 4, chassis 410 includes a backplane 420 with ten module slots 440, including a system slot 441, eight peripheral slots 442, and a timing slot 444. The chassis 410 further includes a mezzanine board 425 mounted to the backplane 420, where the mezzanine board 425 includes PCIe switch 427 providing the switch fabric. The PCIe switch 427 may be a single, 96-lane, 24-port switch, such as a PEX 8796, available from Avago Technologies, Inc., for example. Alternatively, the PCIe switch 427 may be implemented using multiple switches, each dedicated to one or more of the module slots 440, without departing from the scope of the present teachings. In the depicted embodiment, seven of the peripheral slots 442 and the timing slot 444 are connected to the PCIe switch 427 via 8-lane (8×) interface links. The remaining (left-most, in the depicted configuration) peripheral slot 442 is connected to the system slot 441 via an 8-lane interface link. The system slot 441 is connected to the PCIe switch 427 on the mezzanine board 425 via a 16-lane (16×) interface link. In alternative configurations, the PCIe switch 427 may be provided on a PCB separate from the mezzanine board 425, which provides the connectors, ICs and signal lines, without departing from the scope of the present teachings.

The chassis 410 also includes an integrated FPGA accelerator module 430, which comprises an FPGA 431, and two associated DDR3 RAM 435a and 435b. For example, the FPGA 431 may be a Stratix-V FPGA, available from Altera Corporation. The FPGA 431 is connected to the PCIe switch 427 via an 8-lane interface link. Of course, other types of FPGA and associated memory may be incorporated without departing from the scope of the present teachings.

In the depicted embodiment, the module slots 440 include one or more hybrid slots, where a portion of each hybrid slot is configured for PXIe compliant functionality, while another portion of each hybrid slot is configured for PXI compliant functionality. For example, a hybrid slot may include a 32-bit PCI connector, a PCIe connector, and a connector for instrument functions, such as taps, triggers and clocks. To accommodate the hybrid slots, the chassis 410 further includes a PCIe-to-PCI bridge 461, a PCI bus 463 and a chassis endpoint 465. The chassis endpoint 465 may include an SMBus controller, and clock and power system management functionality, for example. Each of the PCIe-to-PCI bridge 461 and the chassis endpoint 465 is connected to the PCIe switch 427 via a corresponding 1-lane (1x) interface link. The PCIe-to-PCI bridge 461 is configured to route signals from PCI-based peripheral modules (received via the PCI bus 463) to the PCIe switch 427, under control of the SMBus controller, for example.

FIG. 5 is a block diagram of an 18-slot chassis with multiple integrated accelerator modules, according to a representative embodiment.

Referring to FIG. 5, chassis 510 includes a backplane 520 with eighteen module slots 540, including a system slot 541, a first set of eight peripheral slots 542, a second set of eight peripheral slots 543, and a timing slot 544. The chassis 510 further includes a mezzanine board 525 mounted to the backplane 520, where the mezzanine board 525 includes first PCIe switch 527 and second PCIe switch 528, providing the switch fabric. In an embodiment, each of the first and second PCIe switches 527 and 528 may be a 96-lane, 24-port switch, such as a PEX 8796, available from Avago Technologies, Inc. The system slot 541 is connected to the first PCIe switch 527 on the mezzanine board 525 via a 16-lane interface link and an 8-lane interface link. The system slot 541 may have a number of alternative configurations, such as two 8-lane interface links and four 4-lane interface links, for example, to ensure optimal performance with most PXIe system controllers, embedded or external. The first PCIe switch 527 is connected to the second PCIe switch 528 via an 8-lane interface link.

In the depicted embodiment, the peripheral slots 542 are connected to the first PCIe switch 527 via 8-lane interface links, while the peripheral slots 543 and the timing slot 544 are connected to the second PCIe switch 528 via 8-lane interface links. In alternative configurations, one or both of the first and second PCIe switches 527 and 528 may be implemented by multiple switches, each dedicated to one or more of the peripheral slots 542 and the peripheral slots 543, respectively. Also, the first and/or second PCIe switches 527 and 528 may be provided on PCBs separate from the mezzanine board 525, which provides the connectors, ICs and signal lines, without departing from the scope of the present teachings.

The chassis 510 also includes multiple integrated FPGA accelerator modules, indicated by representative first integrated FPGA accelerator module 530 and second integrated FPGA accelerator module 630. The first integrated FPGA accelerator module 530 comprises a first FPGA 531, such as a Stratix-V FPGA, and two associated DDR3 RAM 535a and 535b. The second integrated FPGA accelerator module 630 comprises a second FPGA 631, such as a Stratix-V FPGA, and two associated DDR3 RAMs 635a and 635b. Of course, other types of FPGAs and associated memories may be incorporated without departing from the scope of the present teachings. The first FPGA 531 is connected to the first PCIe switch 527 via an 8-lane interface link, and the second FPGA 631 is connected to the second PCIe switch 528 via an 8-lane interface link. The second integrated FPGA accelerator module 630 may also include the chassis endpoint, which is substantially the same as the chassis endpoint 465 discussed above. The chassis endpoint may be incorporated within the second FPGA 631, for example. A high-speed local bus 580 is connected between the first integrated FPGA accelerator module 530 and the second integrated FPGA accelerator module 630, enabling direct, high-speed communications between the first and second FPGAs 531 and 631, as discussed above.

In the depicted embodiment, the peripheral slots 542 and 543 include one or more hybrid slots, where a portion of each hybrid slot is configured for PXIe compliant functionality, while another portion of each hybrid slot is configured for PXI compliant functionality, as discussed above with reference to FIG. 4. To accommodate the hybrid slots in the first set of peripheral slots 542, the chassis 510 further includes a first PCIe-to-PCI bridge 561 and a first PCI bus 563, and to accommodate the hybrid slots in the second set of peripheral slots 543, the chassis 510 further includes a second PCIe-to-PCI bridge 562 and a second PCI bus 564. The chassis endpoint also enables the PCIe-to-PCI bridging. The first and second PCIe-to-PCI bridges 561 and 562 are connected to the first and second PCIe switches 527 and 528, respectively, via 1-lane interface links. The first PCIe-to-PCI bridge 561 is configured to route signals from PCI-based peripheral modules (received via the first PCI bus 563) to the first PCIe switch 527, and the second PCIe-to-PCI bridge 562 is configured to route signals from PCI-based peripheral modules (received via the second PCI bus 564) to the second PCIe switch 528, under control of the SMBus controller, for example.

Figure 1:
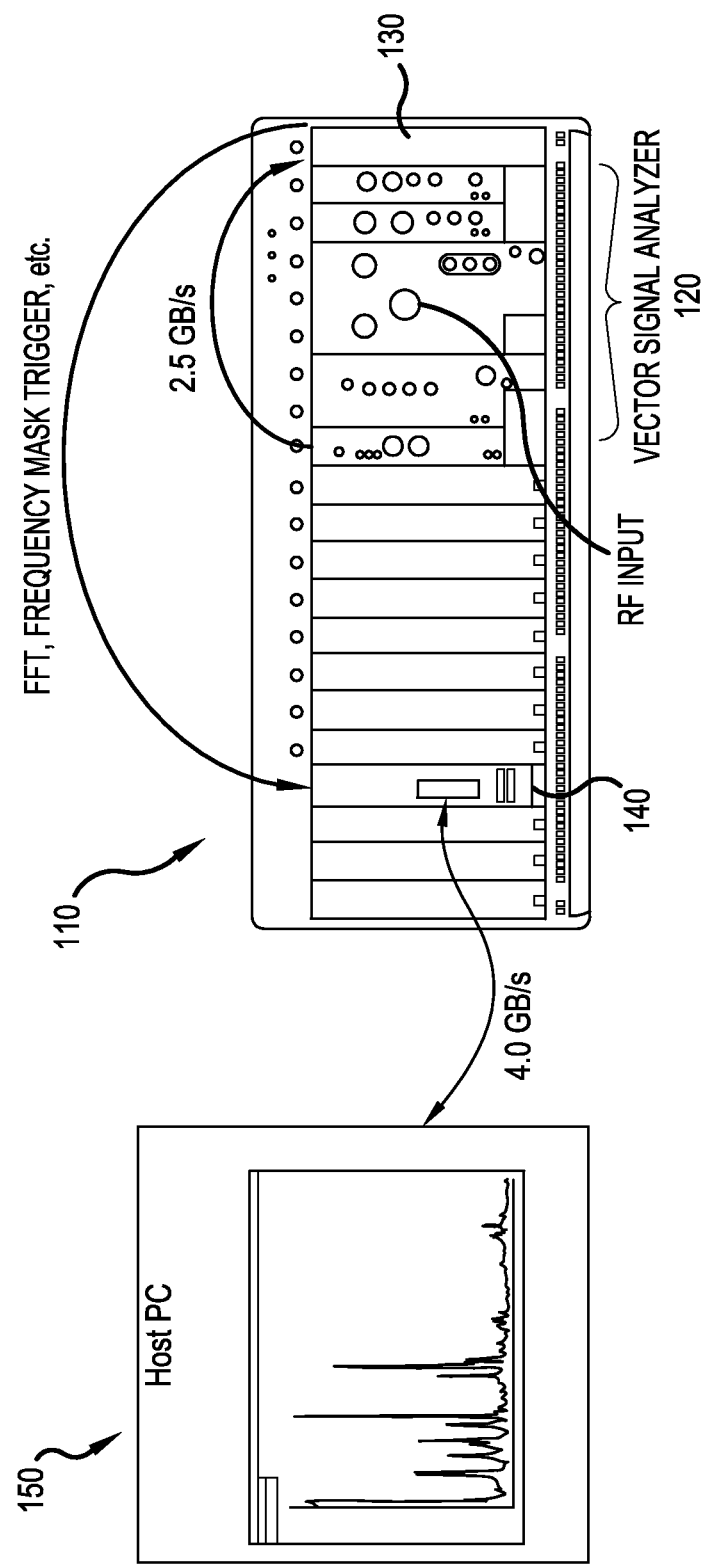
FIG. 1 is an illustrative plan view of conventional PXIe modular instrumentation.

In various embodiments, each of the chassis 410 and the chassis 510 may have a standalone configuration, using an embedded system controller (not shown). The standalone configuration increases flexibility and reduces latency in peer-to-peer communications, for example. In other embodiments, each of the chassis 410 and the chassis 510 may be implemented within a larger system, which includes a host, such as a PC, having a system level host processor (an example of which is provided by representative host PC 150 in FIG. 1). The chassis 410 and the chassis 510 may then be connected to an upstream switch or the root complex through a cabled PCI-E card, for example.

While the disclosure references exemplary embodiments, it will be apparent to those skilled in the art that various changes and modifications may be made without departing from the spirit and scope of the present teachings. Therefore, it should be understood that the above embodiments are not limiting, but illustrative.

What is claimed:

1. A peripheral component interconnect express (PCIe) eXtensions for instrumentation (PXIe) chassis, comprising:
   a backplane;
   a plurality of peripheral slots located on the backplane and configured to receive a plurality of insertable PXIe peripheral modules, respectively;
   a mezzanine card on the backplane and configured to accommodate at least one of connectors, integrated circuits (ICs) and signal lines incorporated in the PXIe chassis; and
   an integrated accelerator module on the mezzanine card within the PXIe chassis and configured to accelerate processing of signals received from the plurality of insertable PXIe peripheral modules.

2. The PXIe chassis of claim 1, wherein the integrated accelerator module is a field programmable gate array (FPGA) accelerator module comprising an FPGA computing card and an associated random-access memory (RAM).

3. The PXIe chassis of claim 1, wherein the integrated accelerator module comprises a printed circuit board (PCB) mounted on the mezzanine card.

4. The PXIe chassis of claim 1, wherein the mezzanine card and the integrated accelerator module are mounted on an opposite side of the backplane than the plurality of peripheral slots.

5. The PXIe chassis of claim 1, further comprising:
   another integrated accelerator module mounted on the mezzanine card and configured to accelerate processing of signals received from the plurality of insertable PXIe peripheral modules.

6. The PXIe chassis of claim 2, wherein the RAM comprises one of dynamic RAM (DRAM) or small outline-dual in-line memory module RAM (SO-DIMM DDR3 RAM).

7. The PXIe chassis of claim 2, further comprising:
   a system slot mounted on the backplane and configured to receive a system controller or a controller interface for interfacing with an external PXIe system controller to control operations of the plurality of insertable PXIe peripheral modules and the FPGA accelerator module.

8. The PXIe chassis of claim 5, further comprising:
   a high-speed local bus enabling high-speed direct communications between the integrated accelerator modules.

9. The PXIe chassis of claim 3, wherein the integrated accelerator module is removable, and interchangeable with different types of integrated accelerator modules.

10. The PXIe chassis of claim 7, further comprising:
    a switch fabric comprising at least one switch mounted on the mezzanine card, the switch fabric enabling connections among the plurality of insertable PXIe peripheral modules and the FPGA accelerator module under control of the system controller via the system slot.

11. The PXIe chassis of claim 10, wherein the switch fabric is reconfigurable under control of the system controller via the system slot.

12. An instrumentation chassis, comprising:
    a backplane;
    a peripheral slot located on the backplane and configured to receive an insertable peripheral module; and
    an integrated accelerator module configured to accelerate processing of signals received from the peripheral module, the integrated accelerator module comprising a printed circuit board (PCB) located within the instrumentation chassis on an opposite side of the backplane than the peripheral slot.

13. The instrumentation chassis of claim 12, wherein the integrated accelerator module comprises a field programmable gate array (FPGA) and a random-access memory (RAM).

14. The instrumentation chassis of claim 12, wherein the instrumentation chassis comprises a peripheral component interconnect express (PCIe) eXtensions for instrumentation (PXIe) chassis.

15. The instrumentation chassis of claim 12, wherein the instrumentation chassis comprises an Advanced Telecommunications Computing Architecture (ATCA) eXtensions for instrumentation (AXIe) chassis.

16. The instrumentation chassis of claim 13, wherein the RAM comprises one of dynamic RAM (DRAM) or small outline-dual in-line memory module RAM (SO-DIMM DDR3 RAM).

17. A peripheral component interconnect express (PCIe) eXtensions for instrumentation (PXIe) system having a reconfigurable interface link architecture, the PXIe system comprising:
- a system slot located on a backplane and configured to receive a PXIe compatible system controller;
- a plurality of peripheral slots located on the backplane and configured to receive a plurality of peripheral modules;
- a switch fabric located on a mezzanine card mounted to the backplane;
- a first integrated field programmable gate array (FPGA) accelerator module mounted to the mezzanine card and configured to accelerate processing of signals received from first peripheral modules of the plurality of peripheral modules;
- a second integrated FPGA accelerator module mounted to the mezzanine card and configured to accelerate processing of signals received from second peripheral modules of the plurality of peripheral modules; and
- a high-speed local bus connecting the first and second integrated FPGA accelerator modules.

18. The PXIe system of claim 17, wherein the switch fabric is reconfigurable for creating a variable number of PCIe interface links between the system slot and the plurality of peripheral slots.

19. The PXIe system of claim 17, wherein the high-speed local bus provides up to three times more bandwidth than each interface link between the plurality of peripheral modules and the switch fabric located on the mezzanine card.

20. The PXIe system of claim 18, further comprising:
- a nonvolatile memory for storing switch images corresponding to configurations of the reconfigurable switch fabric.

* * * * *